(12) United States Patent
Singh et al.

(10) Patent No.: US 9,026,128 B1
(45) Date of Patent: May 5, 2015

(54) SYSTEMS AND METHODS FOR MANAGING SIGNALING TRAFFIC IN A WIRELESS COVERAGE AREA IN RESPONSE TO VARYING CONGESTION

(75) Inventors: Jasinder P. Singh, Olathe, KS (US); Maulik K. Shah, Overland Park, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 305 days.

(21) Appl. No.: 13/594,421

(22) Filed: Aug. 24, 2012

(51) Int. Cl.
*H04W 72/00* (2009.01)
*H04W 28/16* (2009.01)

(52) U.S. Cl.
CPC ...................................... *H04W 28/16* (2013.01)

(58) Field of Classification Search
USPC ................. 455/450–453, 464, 509, 510, 461; 370/338, 901
See application file for complete search history.

(56) References Cited

U.S. PATENT DOCUMENTS

| | | | | |
|---|---|---|---|---|
| 5,778,318 | A * | 7/1998 | Talarmo et al. | 455/452.1 |
| 6,252,865 | B1 | 6/2001 | Walton et al. | |
| 6,430,222 | B1 * | 8/2002 | Okada | 375/240.03 |
| 6,889,050 | B1 * | 5/2005 | Willars et al. | 455/452.2 |
| 6,987,982 | B2 | 1/2006 | Willenegger et al. | |
| 8,614,964 | B1 * | 12/2013 | Vargantwar et al. | 370/252 |
| 8,700,321 | B2 * | 4/2014 | Studzinski | 701/450 |
| 2002/0051442 | A1 * | 5/2002 | Lee et al. | 370/345 |
| 2003/0163558 | A1 * | 8/2003 | Cao et al. | 709/223 |
| 2004/0266446 | A1 * | 12/2004 | Nguyen et al. | 455/450 |
| 2006/0159045 | A1 * | 7/2006 | Ananthaiyer et al. | 370/329 |
| 2006/0168111 | A1 * | 7/2006 | Gidwani | 709/218 |
| 2006/0209758 | A1 * | 9/2006 | Qiang et al. | 370/331 |
| 2007/0003111 | A1 * | 1/2007 | Awatsu et al. | 382/115 |
| 2008/0058000 | A1 * | 3/2008 | Tanaka et al. | 455/550.1 |
| 2008/0108348 | A1 * | 5/2008 | Kottilingal et al. | 455/435.1 |
| 2008/0215573 | A1 * | 9/2008 | Shiu et al. | 707/5 |
| 2009/0103501 | A1 * | 4/2009 | Farrag et al. | 370/337 |
| 2009/0129272 | A1 * | 5/2009 | Padfield et al. | 370/235 |
| 2010/0002582 | A1 | 1/2010 | Luft et al. | |
| 2010/0027449 | A1 * | 2/2010 | Kim et al. | 370/311 |
| 2010/0220595 | A1 * | 9/2010 | Petersen | 370/235 |
| 2010/0274872 | A1 * | 10/2010 | Harrang et al. | 709/217 |
| 2010/0315950 | A1 * | 12/2010 | Venkataraman et al. | 370/235 |
| 2011/0170455 | A1 * | 7/2011 | Cai et al. | 370/259 |
| 2011/0263250 | A1 * | 10/2011 | Mueck et al. | 455/434 |
| 2011/0319049 | A1 * | 12/2011 | Malosh | 455/404.1 |
| 2012/0069765 | A1 * | 3/2012 | Soto | 370/252 |
| 2012/0083279 | A1 * | 4/2012 | Likar et al. | 455/446 |
| 2012/0115512 | A1 * | 5/2012 | Grainger et al. | 455/456.3 |
| 2013/0343206 | A1 * | 12/2013 | Wilhoite et al. | 370/250 |

\* cited by examiner

*Primary Examiner* — Dominic E Rego

(57) ABSTRACT

Disclosed herein are systems and methods for managing signaling traffic in a radio access network (RAN) that provides wireless service to wireless communication devices (WCDs) in a plurality of wireless coverage areas. The RAN may determine a level of ingress of WCDs into a wireless coverage area and/or a level of egress of WCDs out of the wireless coverage area. Further, the RAN may then select a respective transmission rate in the coverage area for one or more control-channel messages based at least in part on a determined ingress level and/or at least in part on a determined egress level. The RAN may then broadcast each control-channel message at that message's respective selected transmission rate.

24 Claims, 10 Drawing Sheets

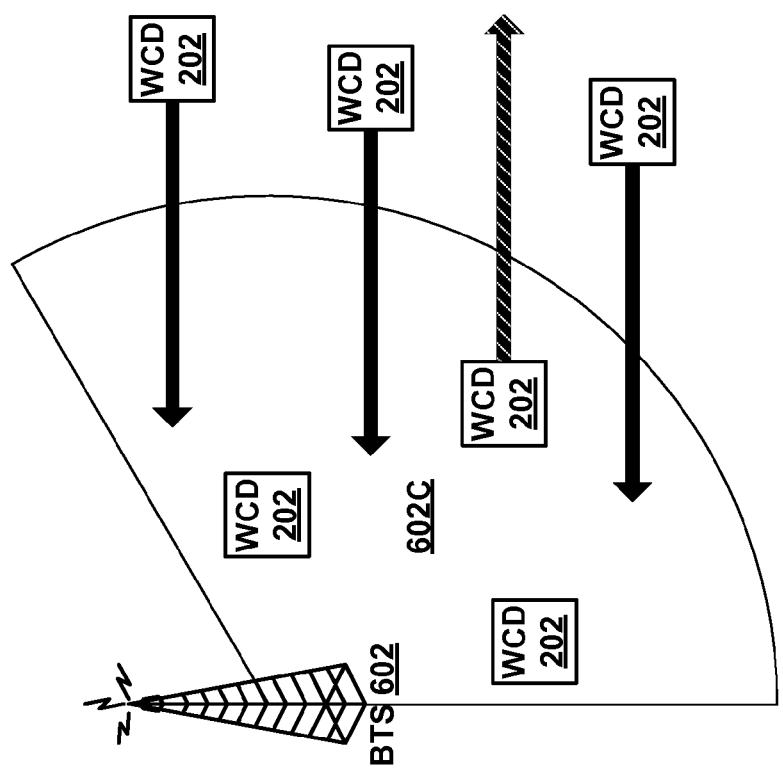

SYSTEMS AND METHODS FOR MANAGING SIGNALING TRAFFIC IN A WIRELESS COVERAGE AREA IN RESPONSE TO VARYING CONGESTION

BACKGROUND

The use of cellular phones and other types of wireless communication devices (WCDs) is becoming increasingly prevalent and popular in modern life. To provide cellular wireless communication service to such WCDs (also often referred to as client devices, user equipment, mobile stations, subscriber devices, access terminals, and the like), a wireless service provider typically operates a radio access network (RAN) that defines coverage areas (e.g., cells, sectors, and the like) in which subscribers' WCDs can be served by the RAN and obtain connectivity to other networks such as the public switched telephone network (PSTN) and the Internet.

A typical RAN includes one or more base transceiver stations (BTSs), each of which may radiate to define one or more coverage areas in which these WCDs can operate. Further, the RAN may include one or more radio network controllers (RNCs) or the like, which may be integrated with or otherwise in communication with the BTSs, and which may include or be in communication with one or more switches and/or gateways that provide connectivity with one or more transport networks. Conveniently, with this arrangement, a WCD that is positioned within the coverage of the RAN can communicate with a BTS and in turn with other served devices and/or with other entities via the one or more transport networks.

In each coverage area, a RAN will typically broadcast (via, e.g., a BTS) a pilot signal that among other purposes notifies WCDs of the presence of the coverage area. In operation, when a WCD detects a pilot signal of sufficient strength, the WCD may transmit what is known as a registration message to the RAN to notify the RAN that the device is in the coverage area, and the device may then operate in the coverage area in what is typically known as "idle" mode. When operating in idle mode, the WCD is not actively engaged in a call or other traffic (e.g., packet-data) communication, but does regularly monitor overhead signals in the coverage area to obtain system information and page messages, as examples.

OVERVIEW

Typically, a RAN sends out various control messages to WCDs in each coverage area, and the content of such messages is often coverage-area-specific. One example of such a control message is a "channel list message" (CLM), which lists the channels (e.g., carrier frequencies) on which the RAN provides service in that particular coverage area. A given WCD may be arranged to receive the CLM, apply a predefined channel-selection process to select a channel from among those listed in the CLM, and then idle (i.e., operate in idle mode) on the selected channel. Another example of such a control message is a "neighbor list message" (NLM), which provides WCDs with information that is helpful in handing off to neighboring coverage areas, which WCDs often do, at times from a coverage area provided by a first BTS to a coverage area provided by a second BTS, and at other times from a coverage area provided by a given BTS to a nearby (e.g., adjacent) coverage area provided by the same BTS, to give a few examples.

The RAN typically broadcasts control messages such as the CLM and the NLM to WCDs at a specific transmission rate or frequency (i.e., periodically according to a fixed period of time). Note that "frequency" as used in this context refers to how often the respective messages are sent out, rather than to a physical frequency on which the messages are transmitted. Relatedly, "rate" (as in, e.g., "transmission rate") as used in this context refers to the same concept, rather than to a particular data rate that would be expressed in terms of, for example, kilobits per second (kbps). Furthermore, in addition to CLMs and NLMs, other examples of periodically transmitted control messages could certainly be given, as CLMs and NLMs are used here by way of example only.

As stated, RANs typically broadcast certain control messages such as CLMs and NLMs at fixed intervals. In some situations, however, this rigid approach is not ideal for providing wireless subscribers with positive user experiences. One such situation occurs when a relatively high number (e.g., a majority) of the WCDs in a given coverage area remain there for a relatively long period of time; i.e., when few if any new WCDs are arriving at the coverage area and few if any WCDs are exiting the coverage area. In this scenario, many if not all of these substantially stationary WCDs have no urgent need to be repeatedly informed of the information conveyed by a typical CLM (since, e.g., the WCDs already know the available channels) or a typical NLM (since, e.g., the WCDs do not appear to be going anywhere anytime soon), and the resources dedicated to repeatedly broadcasting these messages could beneficially be directed elsewhere.

In other times, however, a relatively large number of WCDs may move into a coverage area in a relatively short amount of time, in which case frequent broadcasting of the CLM may be quite beneficial in order to, for example, achieve the distribution among channels to which the content of the CLM is directed. In other (perhaps overlapping) times, a relatively large number of WCDs may move out of a coverage area in a relatively short amount of time, in which case frequent broadcasting of the NLM may be quite beneficial in order to, for example, keep egressing WCDs informed as to the latest handoff-related neighbor information.

To address these problems as well as others, presently disclosed are systems and methods for managing signaling traffic in a wireless coverage area in response to varying congestion. One embodiment takes the form of a method for managing signaling traffic in a RAN that provides wireless communication service to WCDs in a plurality of wireless coverage areas. The method includes the RAN determining (i) a level of ingress of WCDs into a wireless coverage area during a first time period and/or (ii) a level of egress of WCDs out of the wireless coverage area during a second time period. The method also includes the RAN selecting a respective transmission rate in the wireless coverage area for each control-channel message in a set of one or more control-channel messages based at least in part on at least one determined level (i.e., based at least in part on a determined level of ingress and/or at least in part on a determined level of egress). The method further includes the RAN broadcasting in the wireless coverage area each control-channel message in the set of one or more control-channel messages at that message's respective selected transmission rate.

Another embodiment takes the form of a RAN that includes at least one wireless-communication interface, at least one processor, and data storage containing program instructions executable by the at least one processor for carrying out the just-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which:

FIGS. 7A-7C are simplified illustrations of various scenarios involving WCDs moving into and/or out of a given wireless coverage area.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
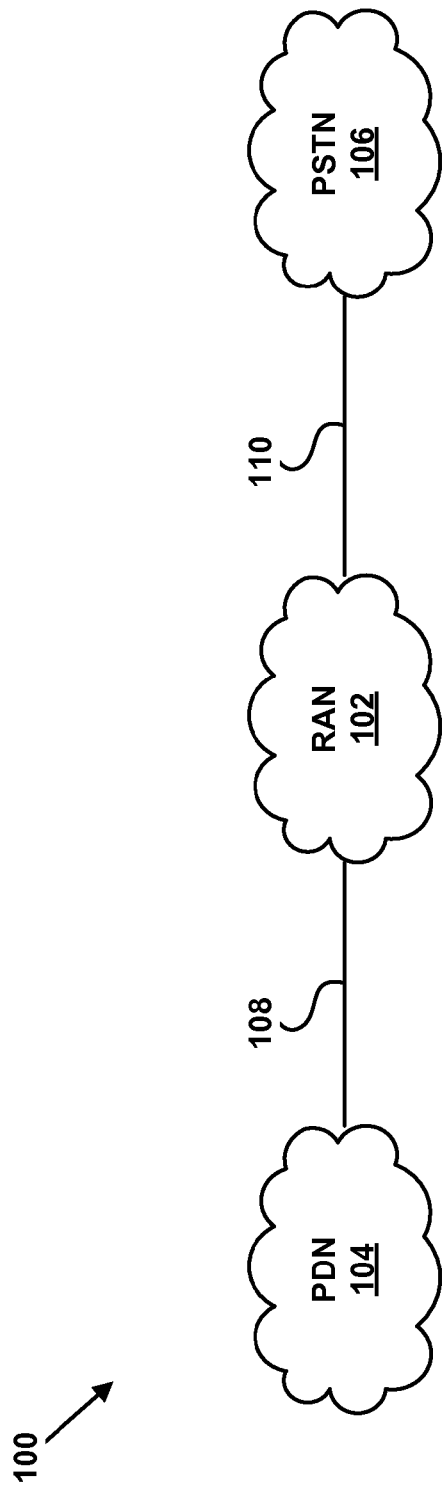
FIG. 1 is a simplified diagram depicting an example communication system.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

Figure 2:
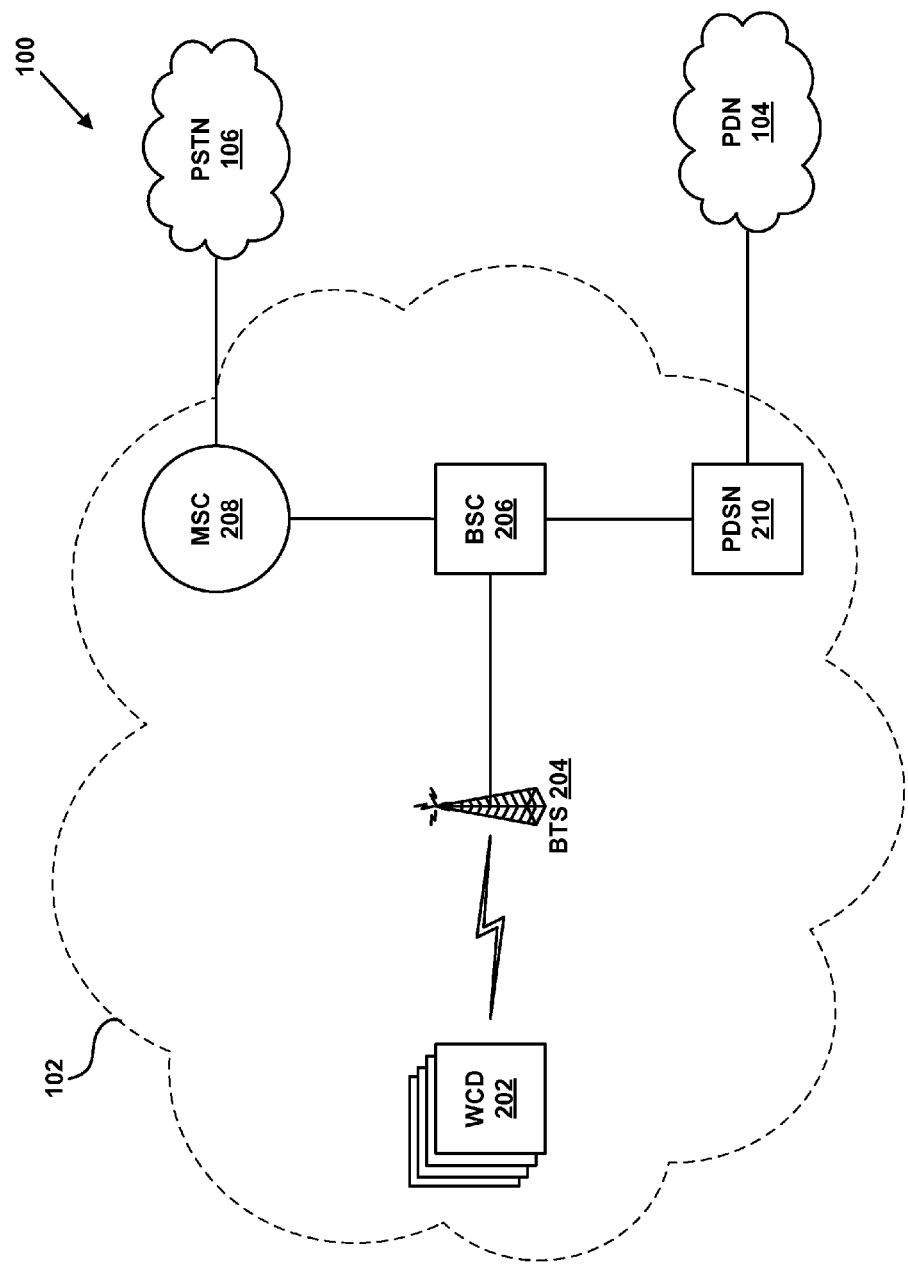
FIG. 2 is a simplified diagram depicting an example radio access network (RAN) in the context of the example communication system of FIG. 1.

FIG. 2 depicts communication system 100 with a more detailed depiction of RAN 102, which is shown in this example as serving a plurality of WCDs 202, a BTS 204, a base station controller (BSC) 206, a mobile switching center (MSC) 208, and a packet data serving node (PDSN) 210. Additional entities could also be present; for example, there could be additional WCDs in communication with BTS 204; as another example, there could be additional entities in communication with PDN 104 and/or PSTN 106. Also, there could be one or more routers, switches, and/or other devices or networks making up at least part of one or more of the communication links. And other variations are possible as well.

The WCDs 202 may be any devices arranged to carry out the WCD functions described herein. As such, a given WCD 202 may include a user interface, a wireless-communication interface, a processor, and data storage containing instructions executable by the processor for carrying out those functions. The user interface may include buttons, a touchscreen, a microphone, and/or any other elements for receiving inputs, as well as a speaker, one or more displays, and/or any other elements for communicating outputs.

BTS 204 may be any network element arranged to carry out the BTS functions described herein. As such, BTS 204 may include a communication interface, a processor, and data storage containing instructions executable by the processor to carry out those functions. The communication interface may include one or more antennas, chipsets, and/or other components for providing one or more coverage areas such as cells and sectors, for communicating with WCDs 202 over an air interface. The communication interface may be arranged to communicate according to one or more protocols mentioned herein and/or any others now known or later developed. The communication interface may also include one or more wired and/or wireless interfaces for communicating with at least BSC 206.

BSC 206 may be any network element arranged to carry out the BSC functions described herein. As such, BSC 206 may include a communication interface, a processor, and data storage containing instructions executable by the processor to carry out those functions. The communication interface may include one or more wired and/or wireless interfaces for communicating with at least BTS 204, MSC 208, and PDSN 210. In general, BSC 206 functions to control one or more BTSs such as BTS 204, and to provide one or more BTSs such as BTS 204 with connections to devices such as MSC 208 and PDSN 210. Note that, as used herein, "base station" may mean a BTS, or may mean a combination of a BTS and a BSC. In general, the RAN 102 could include any number of BTSs communicating with any number of BSCs.

Figure 3:
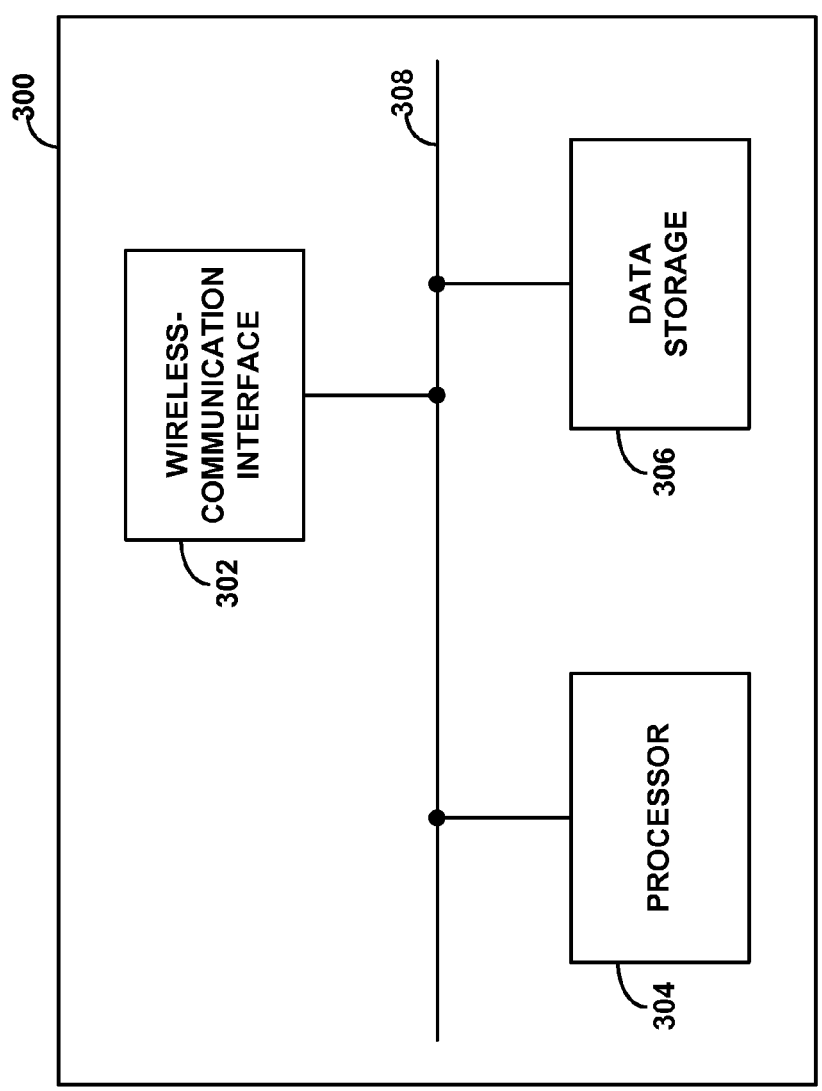
FIG. 3 is a simplified diagram depicting an example wireless communication device (WCD)

FIG. 3 depicts a representative WCD 300. Anyone or more of the WCDs 202 could have a structure similar to that of the WCD 300, which is depicted as including a wireless-communication interface 302, a processor 304, and data storage 306, all of which may be coupled together by a system bus, network, or other connection mechanism 308.

Wireless-communication interface 302 may comprise one or more antennae and one or more chipsets for communicating with one or more base stations over respective air interfaces. As an example, one such chipset could be one that is suitable for CDMA (Code Division Multiple Access) communication. The chipset or wireless-communication interface in general may also or instead be arranged to communicate according to one or more other types (e.g. protocols) mentioned herein and/or any others now known or later developed. The processor and data storage may be any suitable components known to those of skill in the art. As examples, WCD 300 could be or include cell phones, smartphones, tablets, and the like.

Processor 304 may comprise one or more general-purpose processors and/or one or more special-purpose processors, and may be integrated in whole or in part with wireless-communication interface 302. Data storage 306 may comprise one or more volatile and/or non-volatile storage components (such as magnetic, optical, flash, or other non-transitory storage) and may be integrated in whole or in part with processor 304. And certainly other configurations are possible. Data storage 306 may contain program instructions executable by processor 304 to for carrying out various WCD functions described herein.

Figure 4:
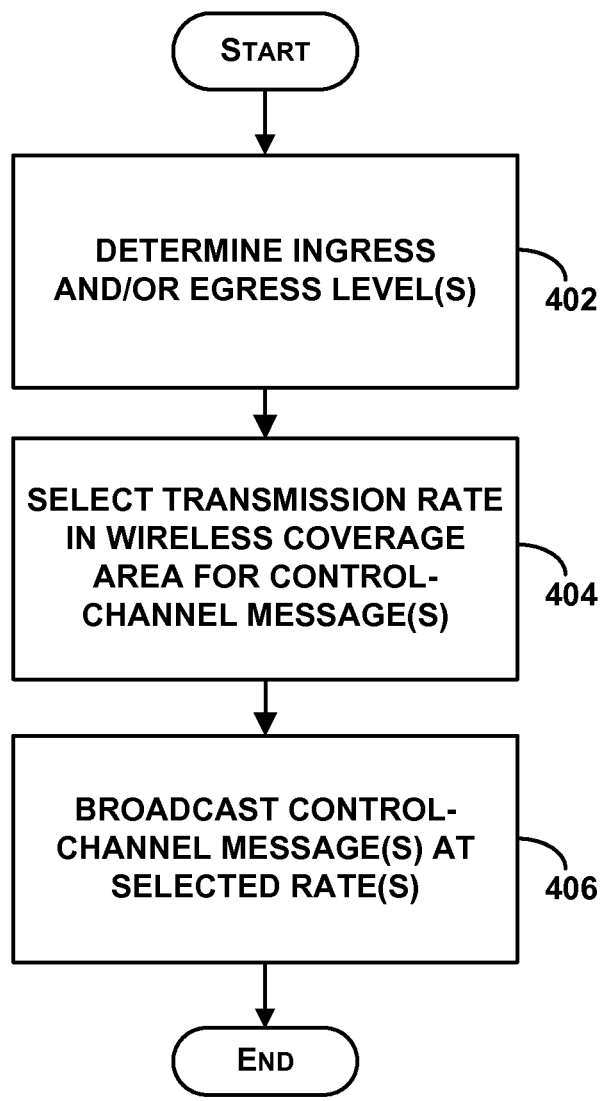
FIG. 4 is flowchart depicting functions that are carried out in accordance with at least one embodiment.

FIG. 4 is a flowchart depicting in summary some of the functions that could be carried out by RAN 102 in accordance with an example method. As shown in FIG. 4, at block 402, the RAN determines a level of ingress of WCDs into a coverage area over a first time period and/or a level of egress of WCDs out of a coverage area over a second time period. The first time and second time periods could be the same time period or two different (but possibly overlapping) time periods.

Furthermore, it is noted that WCDs moving "into" and "out of" a given coverage area may be defined in different ways and take different forms in different contexts. In one example, a WCD may move into a given coverage area by registering with the given coverage area, and conversely may move out of a given coverage area by de-registering with the given coverage area. In another example, a WCD may move into a given coverage area by adding that coverage area to what is known as the WCD's "active set" of coverage areas, and conversely may move out of a given coverage area by dropping or removing that coverage area from the WCD's active set. In yet another example, a WCD may move into a given coverage area by entering a geographic boundary (i.e., footprint) of the coverage area, and may conversely move out of a given coverage area by leaving the geographic footprint of the coverage area. And certainly other manners of moving into and/or out of various coverage areas could be defined in various contexts without departing from the present systems and methods, including any combination of the described approaches and/or one or more other approaches.

At block 404, RAN 102 selects a respective transmission rate in the coverage area for one or more control-channel messages such as a CLM and/or an NLM. RAN 102 does so based at least in part on at least one determined level of ingress of WCDs into the coverage area and/or based at least in part on at least one determined level of egress of WCDs from the coverage area. At block 406, RAN 102 broadcasts the one or more control-channel messages at each message's respective selected transmission rate. As one example, RAN 102 may select a rate of "once every five seconds" as the respective selected transmission rate for the CLM and a rate of "once every three seconds" as the respective selected transmission rate for the NLM. And certainly numerous other examples are possible.

FIGS. 5A, 5B, 6, 7A, 7B, and 7C are provided to further illustrate the present systems and methods, including the functions described above in connection with FIG. 4.

Figure 5A:
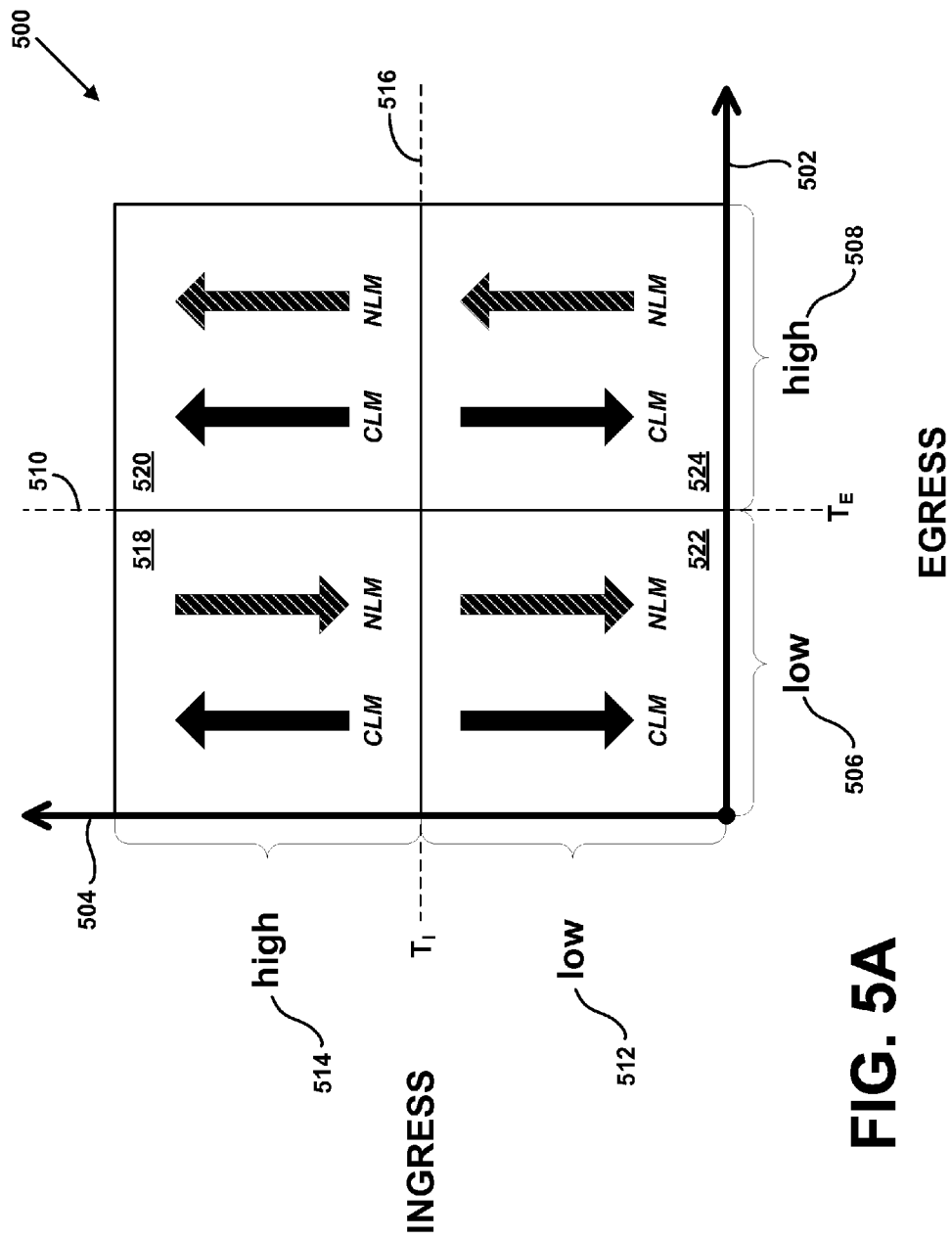
FIG. 5A is a simplified illustration depicting a first example approach according to which a RAN may select respective transmission rates of various control messages in accordance with at least one embodiment.

FIG. 5A depicts a one example approach according to which the RAN 102 may select respective transmission rates for various control messages. In particular, FIG. 5A depicts a transmission-rate-selection chart 500 that includes X axis 502 (labeled "egress") and Y axis 504 (labeled "ingress"). Egress axis 502 corresponds to a level of egress determined by RAN 102, and the ingress axis 504 corresponds to a level of ingress determined by RAN 102. Further, each axis 502, 504 is divided into two portions.

On egress axis 502, the portion 506 closer to the origin of the axis corresponds to a determined level of egress being considered to be relatively low, while the portion 508 furthest from the origin of the axis corresponds to a determined level of egress being considered to be relatively high. Separating the portions 506 and 508 is an egress threshold ($T_E$) 510, which represents a value predetermined by or for (perhaps provisioned into) RAN 102 such that a determined level of egress that is less than egress threshold 510 is considered low while a determined level of egress that is greater than egress threshold 510 is considered high.

On ingress axis 504, the portion 512 closer to the origin of the axis corresponds to a determined level of ingress being considered to be relatively low, while the portion 514 furthest from the origin of the axis corresponds to a determined level of ingress being considered to be relatively high. Separating the portions 512 and 514 is an ingress threshold ($T_I$) 516, which represents a value predetermined by of for (or perhaps provisioned into) RAN 102 such that a determined level of ingress that is less than ingress threshold 516 is considered low while a determined level of ingress that is greater than ingress threshold 516 is considered high. In various embodiments, the actual values chosen for thresholds such as egress threshold 510 and ingress threshold 516 will typically depend on context, system policies, and the like.

When depicted in the manner shown in FIG. 5A, thresholds 510 and 516 cooperate with axes 502 and 504 to define four regions 518-524 on the chart 500. Each of the regions 518-524 corresponds to a collective response taken by RAN 102 given various different determined levels (i.e., ranges) of ingress and egress over a given period of time. And it is noted that, while this example includes description of determining and acting in response to both a level of ingress of WCDs into a coverage area and a level of egress of WCDs out of a coverage area, and in fact with respect to substantially the same period of time, this is certainly not required, as various other embodiments may involve the determination and reaction to only ingress or only egress, evaluation over different time periods, and other variations and combinations in various contexts.

Returning to FIG. 5A, it can be seen that, in the context of a given coverage area over a given time period, RAN 102 may independently (i) respond to determined levels of ingress of WCDs into the coverage area during the time period by adjusting the transmission rate of the CLM in that coverage area and (ii) respond to determined levels of egress of WCDs from the coverage area during the time period by adjusting the transmission rate of the NLM in that coverage area. This is depicted in FIG. 5A in each of the four regions 518-524 with (i) the action taken by RAN 102 with respect to the CLM being represented by a solid arrow and (ii) the action taken by RAN 102 with respect to the NLM being represented by a striped arrow.

Region 518 corresponds to RAN 102 reacting to determining a high level 514 of ingress by increasing the transmission rate of the CLM and to determining a low level 506 of egress by decreasing the transmission rate of the NLM. Region 520 corresponds to RAN 102 reacting to determining a high level 514 of ingress by increasing the transmission rate of the CLM and to determining a high level 508 of egress by increasing the transmission rate of the NLM. Region 522 corresponds to RAN 102 reacting to determining a low level 512 of ingress by decreasing the transmission rate of the CLM and to determining a low level 506 of egress by decreasing the transmission rate of the NLM. Region 524 corresponds to RAN 102 reacting to determining a low level 512 of ingress by decreasing the transmission rate of the CLM and to determining a high level 508 of egress by increasing the transmission rate of the NLM.

Figure 5B:
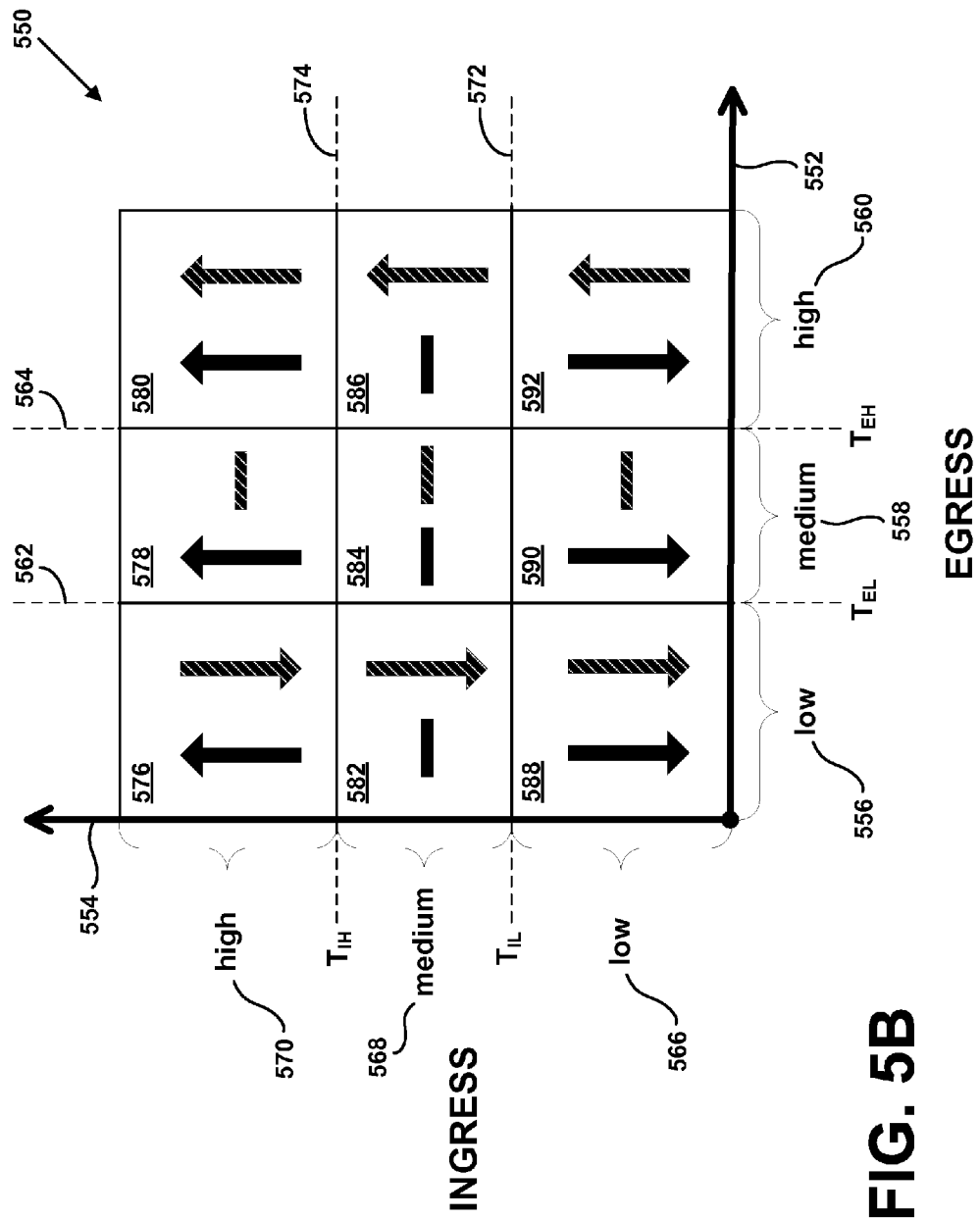
FIG. 5B is a simplified illustration depicting a second example approach according to which a RAN may select respective transmission rates of various control messages in accordance with at least one embodiment.

FIG. 5B is similar in many ways to FIG. 5A, though FIG. 5B depicts the use of two thresholds (and thus three regions (low, medium, and high)) for each of ingress and egress. Thus, the thresholds $T_{IL}$ ("threshold ingress low") 572, $T_{IH}$ ("threshold ingress high") 574, $T_{EL}$ ("threshold egress low") 562, and $T_{EH}$ ("threshold egress high") 564 cooperate with ingress axis 554 and egress axis 552 to divide the chart 550 into nine regions 576-592. In each region, the solid arrow or dash corresponds to the CLM while the striped arrow or dash corresponds to the NLM. The level of ingress or egress being low results in a decrease of transmission rate of the respective CLM or NLM, while medium results in the rate remaining unchanged (represented using the dash), and high results in the rate being increased. Again, this is purely by way of example, and certainly other policies and approaches could be used in various implementations.

Furthermore, it is noted that the respective selected transmission rate for at least one control-channel message could be identical to that of at least one other control-channel message. In some cases, however, the selected transmission rate for each control-channel message may be unique to that message. Further, the selected transmission rate of control-channel messages such as the CLM and the NLM may be increased or decreased proportionally to one or more of the ingress level and the egress level. In some cases, respective selected transmission rate of the CLM and the NLM may be proportional to the rate at which WCDs move into or out of a coverage area over a period of time. And other examples are possible as well.

Figure 6:
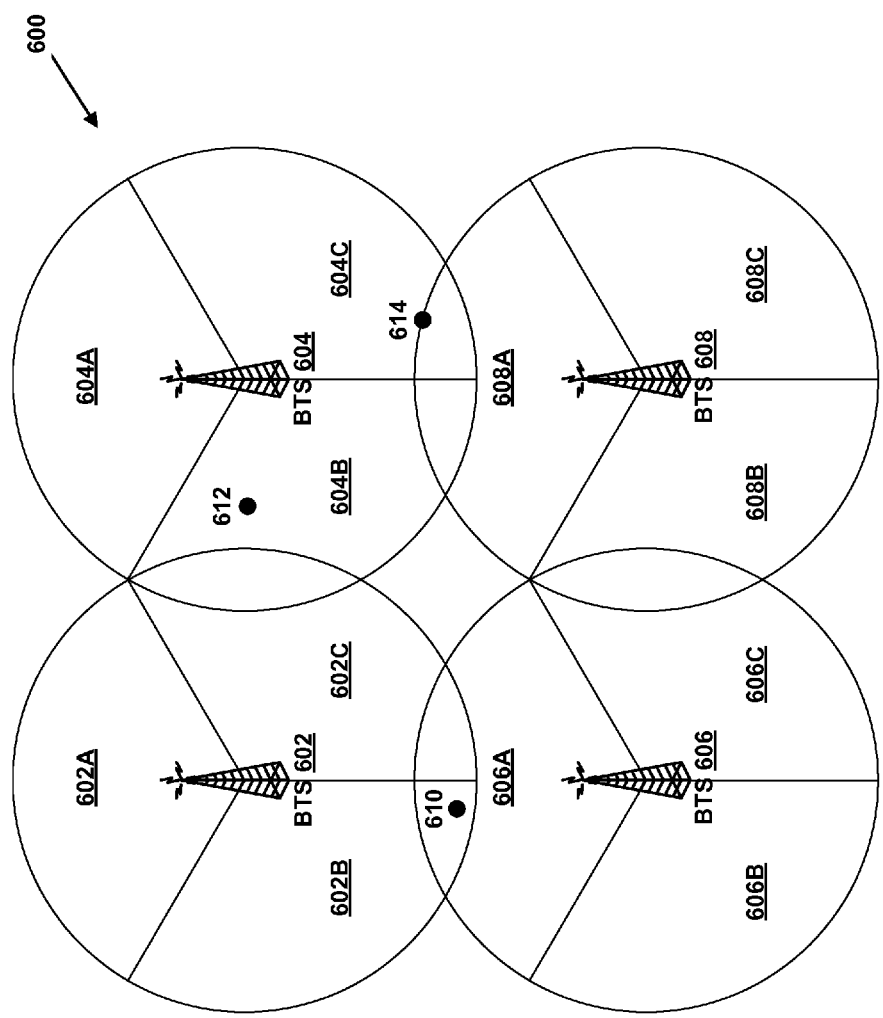
FIG. 6 is a simplified diagram depicting an example subset of an example RAN.

For further illustration and explanation of the present systems and methods, reference is now made to FIG. 6, which depicts an example subset 600 of RAN 102. Subset 600 includes four base stations 602-608, each providing service in three sectors (labeled A, B, and C for their corresponding base stations. In the example depicted in FIG. 6, each base station 602-608 communicates with WCDs within a circular boundary made up of three sectors. In other examples, however, the geographic boundaries of the sectors may vary in size and shape.

Each sector (i.e., the hardware and software of the corresponding base station providing service in that sector) communicates with WCDs (not shown) that at the time are present in the sector, where presence can mean one or more of (i) being situated in a geographic footprint of the sector, (ii) being registered with (and/or via) the sector, (iii) having the sector currently included in an active set, and/or one or more other manners of delineating presence in a sector or other coverage area. Each sector broadcasts control-channel messages such as CLMs and NLMs, some or all of which have sector-specific content. Thus, a WCD at location 610 may be considered "in" and thus receive control-channel messages from both sector 602B and sector 606A, while a WCD at location 612 may receive control-channel messages from only sector 604B, and a WCD a location 614 may receive control-channel messages from both sector 604C and sector 608A. And certainly these are but a few representative examples.

Moreover, if RAN 102 operates according to a protocol such as CDMA that implements the mechanism known in the art as the active set containing up to, e.g., six coverage areas (sectors) at any given time, a WCD at location 610 may be considered "in" and thus receive control-channel messages from each sector in an active set such as {606A, 602B, 602C, 604B, 606B, 606C}. Similarly, a WCD at location 612 may receive control-channel messages from each sector in an active set such as {604B, 604A, 602C, 602A, 606A, 608A}, while a WCD at location 614 may receive control-channel messages from each sector in an active set such as {604C, 608A, 604B, 608C, 608B, 604A}. And certainly numerous other examples are possible. As is known in the art, WCDs may add and drop sectors from their respective active sets as they move within a network, and may correspondingly for purposes of this disclosure be considered to be moving into sectors that they add and to be moving out of sectors that they drop.

Figure 7A:
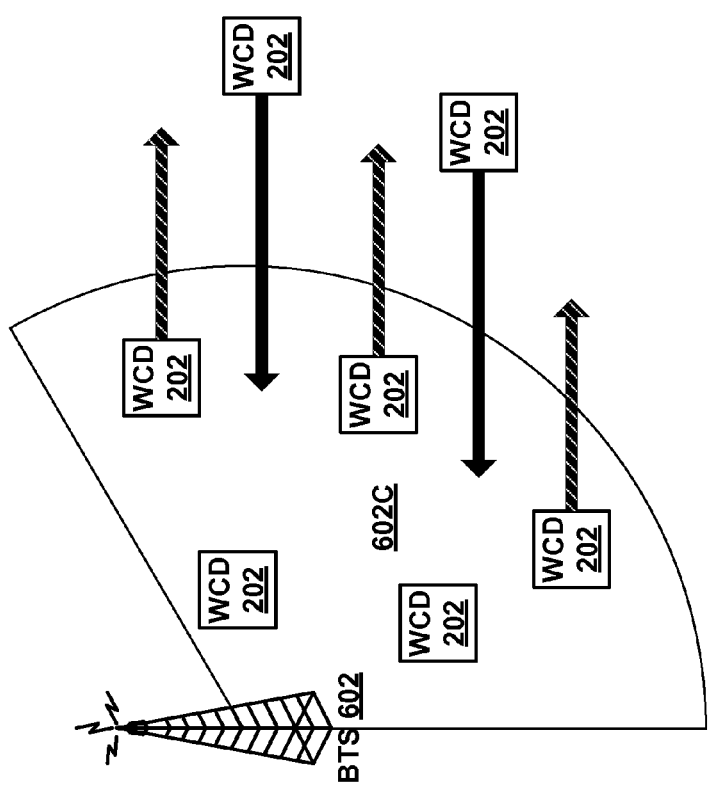
Figure 7C:
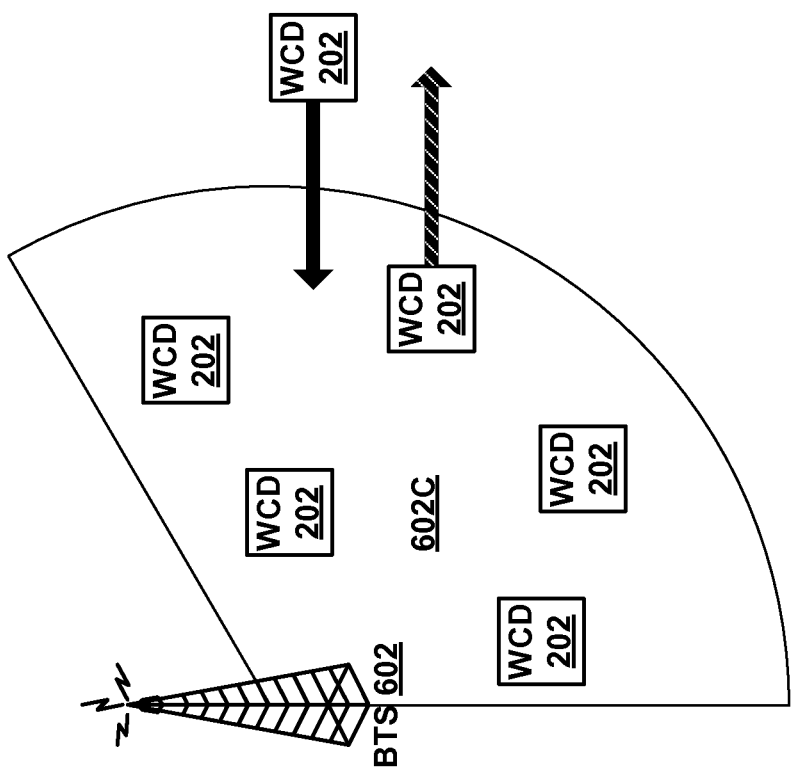

FIGS. 7A-7C depict various scenarios involving example ingress and egress levels that could occur with respect to a given coverage area. In these figures, sector 602C from FIG. 6 is used as the example coverage area, and the various WCDs 202 are depicted such that solid arrows into sector 602C represent ingress, striped arrows out of sector 602C represent egress, and the absence of an arrow for a given WCD represents that WCD staying substantially where it is (i.e., in the coverage area) for the relevant time period.

Moreover, and adopting the example approach depicted in FIG. 5B, FIGS. 7A-7C are described herein using the following representative example threshold values:

$T_{EL}$ (egress low) (562): 0.5 WCDs
$T_{EH}$ (egress high) (564): 1.5 WCDs
$T_{IL}$ (ingress low) (572): 0.5 WCDs
$T_{IH}$ (ingress high) (574): 2.5 WCDs Thus, FIG. 7A depicts a scenario where (i) the egress level is 3, and thus would be considered high (again, using the chart shown in FIG. 5B), resulting in an increase in the transmission rate of the NLM and (ii) the ingress level is 2, and thus would be considered medium, resulting in a maintaining of the same transmission rate of the CLM. FIG. 7B depicts a scenario where (i) the egress level is 1 (medium), resulting in a maintaining of the same transmission rate of the NLM and (ii) the ingress level is 3 (high), resulting in an increase in the transmission rate of the CLM. Lastly, FIG. 7C depicts a scenario where (i) the egress level is 1 (medium), resulting in a maintaining of the same transmission rate of the NLM and (ii) the ingress level is also 1 (medium), resulting in a maintaining of the same transmission rate of the CLM. And certainly numerous other examples are possible as well, as these are presented for illustration and not by way of limitation.

While some example embodiments have been described above, those of ordinary skill in the art will appreciate that numerous changes to the described embodiments could be made without departing from the scope and spirit of the claims.

We claim:

1. A method for managing signaling traffic in a radio access network (RAN) that provides wireless communication service to wireless communication devices (WCDs) in a plurality of wireless coverage areas, the method comprising:
   the RAN determining one or both of:
   (i) a level of ingress of WCDs into a wireless coverage area during a first time period, and
   (ii) a level of egress of WCDs out of the wireless coverage area during a second time period;
   based at least in part on the determined one or both of the level of ingress and the level of egress, the RAN selecting, respectively for each of one or more control-channel messages, a transmission rate at which to broadcast the control-channel message in the wireless coverage area; and
   the RAN broadcasting, in the wireless coverage area, each control-channel message of the one or more control-channel messages at that message's respective selected transmission rate.

2. The method of claim 1, wherein WCDs come into the wireless coverage area at least in part by registering with the wireless coverage area.

3. The method of claim 1, wherein WCDs move out of the wireless coverage area at least in part by de-registering from the wireless coverage area.

4. The method of claim 1, wherein WCDs come into the wireless coverage area at least in part by adding the wireless coverage area to their respective active sets.

5. The method of claim 1, wherein WCDs move out of the wireless coverage area at least in part by removing the wireless coverage area from their respective active sets.

6. The method of claim 1, wherein WCDs come into the wireless coverage area at least in part by moving into a geographic footprint of the wireless coverage area.

7. The method of claim 1, wherein WCDs move out of the wireless coverage area at least in part by moving out of a geographic footprint of the wireless coverage area.

8. The method of claim 1, wherein the first time period and the second time period are the same time period.

9. The method of claim 1, wherein the first time period and the second time period are two different time periods.

10. The method of claim 1, wherein the RAN determines a level of ingress of WCDs into the wireless coverage during the first time period.

11. The method of claim 10, wherein the one or more control-channel messages includes a channel-list message.

12. The method of claim 11, wherein the RAN selects a transmission rate for the channel-list message based at least in part on the determined level of ingress.

13. The method of claim 12, wherein the RAN selects an increased transmission rate for the channel-list message when the determined level of ingress exceeds an upper ingress threshold.

14. The method of claim 12, wherein the RAN selects a decreased transmission rate for the channel-list message when the determined level of ingress is less than a lower ingress threshold.

15. The method of claim 1, wherein the RAN determines a level of egress of WCDs out of the wireless coverage area during the second time period.

16. The method of claim 15, wherein the one or more control-channel messages includes a neighbor-list message.

17. The method of claim 16, wherein the RAN selects a transmission rate for the neighbor-list message based at least in part on the determined level of egress.

18. The method of claim 17, wherein the RAN selects an increased transmission rate for the neighbor-list message when the determined level of egress exceeds an upper egress threshold.

19. The method of claim 17, wherein the RAN selects a decreased transmission rate for the neighbor-list message when the determined level of egress is less than a lower egress threshold.

20. The method of claim 1, wherein the one or more control-channel messages includes a channel-list message.

21. The method of claim 1, wherein the one or more control-channel messages includes a neighbor-list message.

22. The method of claim 1, carried out periodically.

23. A radio access network (RAN) that provides wireless communication service to wireless communication devices (WCDs) in a plurality of wireless coverage areas, the RAN comprising:
   at least one wireless-communication interface;
   at least one processor; and
   data storage containing program instructions executable by the at least one processor for:
      determining one or both of:
         (i) a level of ingress of WCDs into a wireless coverage area during a first time period, and
         (ii) a level of egress of WCDs out of the wireless coverage area during a second time period;
      based at least in part on the determined one or both of the level of ingress and the level of egress, selecting, respectively for each of one or more control-channel messages, a transmission rate at which to broadcast the control-channel message in the wireless coverage area; and
      broadcasting, in the wireless coverage area, each control-channel message of the one or more control-channel messages at that message's respective selected transmission rate.

24. A method for managing signaling traffic in a radio access network (RAN) that provides wireless communication service to wireless communication devices (WCDs) in a plurality of wireless coverage areas, the method comprising:
   the RAN determining at least one rate selected from the group consisting of: (i) a rate at which WCDs move into a wireless coverage area and (ii) a rate at which WCDs move out of the wireless coverage area;
   based on the at least one determined rate, the RAN selecting a transmission rate that is proportional to a given one of the at least one determined rate, wherein the selected transmission rate is a transmission rate at which to broadcast a control-channel message to WCDs in the wireless coverage area; and
   the RAN broadcasting, to the WCDs in the wireless coverage area, the control-channel message at the selected transmission rate.

* * * * *